United States Patent [19]

Lauth et al.

[11] Patent Number: 5,559,065
[45] Date of Patent: Sep. 24, 1996

[54] COATED CATALYSTS

[75] Inventors: Guenter Lauth, Grosskarlbach; Wolfgang Hoelderich, Frankenthal; Klaus Harth, Altleiningen; Hartmut Hibst, Schriesheim, all of Germany

[73] Assignee: BASF Aktiengesellschaft, Ludwigshafen, Germany

[21] Appl. No.: 305,817

[22] Filed: Sep. 14, 1994

Related U.S. Application Data

[63] Continuation of Ser. No. 69,158, May 28, 1993, abandoned.

[30] Foreign Application Priority Data

Jun. 26, 1992 [DE] Germany ............................ 42 21 011.9

[51] Int. Cl.$^6$ ..................................................... B01J 23/40
[52] U.S. Cl. ............................ 502/5; 502/330; 502/333; 502/334; 502/339; 204/192.1; 204/192.15
[58] Field of Search ........................... 502/5, 339, 349, 502/330, 333, 334; 704/192.1, 192.15

[56] References Cited

U.S. PATENT DOCUMENTS

| | | | |
|---|---|---|---|
| 2,223,777 | 12/1940 | Beeck et al. | 502/337 |
| 3,341,936 | 9/1967 | Sanstede et al. | 502/101 |
| 3,773,894 | 11/1973 | Bernstein et al. | 502/314 |
| 3,965,463 | 6/1976 | Chaudhari et al. | 340/174 TF |
| 3,966,645 | 6/1976 | Cairns et al. | 252/465 |
| 4,046,712 | 9/1977 | Cairns et al. | 502/5 |
| 4,469,640 | 9/1984 | Carcia et al. | 502/314 |
| 4,536,482 | 8/1985 | Carcia | 502/5 |
| 4,585,540 | 4/1986 | Beer et al. | 502/101 |
| 4,788,082 | 11/1988 | Schmitt | 427/248.1 |
| 4,844,716 | 7/1989 | Goldman et al. | 44/68 |
| 5,063,194 | 11/1991 | Broecker et al. | 502/314 |

FOREIGN PATENT DOCUMENTS 1103442  2/1968  United Kingdom.

OTHER PUBLICATIONS

Dechema–Monographic, vol. 113, pp. 205–220 (1988).
Imamura and Wallace, J. Phys. Chem. vol. 83, pp. 2009–2012 (1979).
Nippon Kagakukaishi, pp. 1064–1069 (1985).

Primary Examiner—Anthony McFarlane
Attorney, Agent, or Firm—John H. Shurtleff

[57] ABSTRACT

A coated catalyst is prepared by depositing an alloy by physical vapor deposition and/or chemical vapor deposition on a molding, at least one alloy component being a metal selected from the group consisting of aluminum, gallium, silicon, germanium, tin, lead, bismuth, yttrium, titanium, zirconium, vanadium, niobium, tantalum, chromium, molybdenum, tungsten, iron, cobalt, ruthenium, rhodium, palladium, osmium, iridium, platinum, copper, silver, gold and zinc.

16 Claims, No Drawings

COATED CATALYSTS

This application is a continuation of application Ser. No. 08/069,158, filed May 28, 1993 (abandoned).

The invention relates to novel coated catalysts prepared by depositing an alloy by physical vapor deposition and/or by chemical vapor deposition onto a molding.

It is known that catalysts having a coat structure are particularly suitable for certain catalytic reactions, in particular selective hydrogenations, for example of cyclooctadiene, and oxidation reactions with oxygen in the gas phase, for example the preparation of acrolein and acrylic acid from propene or phthalic anhydride from xylene. The coat thickness may have a substantial effect on the activity and selectivity (T. Haas, Chr. Otto and J. Gaube, Dechema-Monographs, 113 (1988) 205–220).

Controlled preparation of coated catalysts having a defined thickness is possible only under extremely labor-intensive conditions, if at all, particularly with the aid of the conventional impregnation method.

The catalytic activity of alloys, in particular after a pretreatment (activation), is disclosed, for example, in J. Phys. Chem., 83 (1979), 2009–2012. In the case of certain catalytic reactions, amorphous alloys have proven particularly advantageous starting materials. These are used as catalysts either directly or after a pretreatment (M. Shibata and T. Masumoto: "Amorphous Alloys as Catalysts or Catalyst Precursors" in "Preparation of Catalysts IV", Studies in Surface Science and Catalysis, D. B. Delmon, P. Grange, P. A. Jacobs and G. Poncelet (Editors), pages 353 to 371, 1987, Elsevier, Amsterdam). These are homogeneous catalysts.

However, the preparation of a catalyst from an alloy, in particular an amorphous alloy, is difficult. The comminution of the usually compact alloy presents difficulties, as does the shaping of the comminuted alloy to give a molding conventional in catalysis. The preparation method, for example via the melt spinning process, is also very difficult. Here too, it is always homogeneous catalysts which are prepared.

The preparation of coated catalysts having a defined coat thickness from conventionally prepared alloys is not possible.

It is known that amorphous alloy layers can also be produced by physical or chemical deposition under low pressure, this being referred to as physical vapor deposition (PVD) or chemical vapor deposition (CVD) (cf. R. F. Bunshah et al., "Deposition Technologies for Films and Coatings", Noyes Publications, 1982). Known PVD methods are vapor deposition, sputtering ("Sputtern") or arc deposition, and known CVD methods include thermal CVD and plasma-supported CVD.

Many applications of amorphous PVD/CVD layers are already known, but flat carriers having smooth surfaces and as a rule a large area are used. Thus, an amorphous alloy layer produced by sputtering and consisting of rare earths and transition metals is used for information storage, for example in erasable magnetooptical storage disks (DE-A-23 42 886).

A further application relates to the production of thin-film metal resistors by the deposition of finely crystalline Ni—Cr layers on suitable ceramic carriers by sputtering.

Nippon Kagakukaishi, (1985), 1064–1069, discloses the production of amorphous nickel-boron layers by plasma-supported deposition of a mixture of $B_2H_6$, Ar and $H_2$ in nickel reactors, and their catalytic activity in the hydrogenation of 1,3-butadiene.

It is an object of the present invention to prepare coated catalysts in a simpler manner.

We have found that this object is achieved by novel coated catalysts prepared by depositing an alloy by physical vapor deposition and/or by chemical vapor deposition on a molding, where at least one alloy component is a metal selected from the group consisting of aluminum, gallium, silicon, germanium, tin, lead, bismuth, yttrium, titanium, zirconium, vanadium, niobium, tantalum, chromium, molybdenum, tungsten, iron, cobalt, ruthenium, rhodium, palladium, osmium, iridium, platinum, copper, silver, gold and zinc.

The top layer is applied to the substrate by physical vapor deposition (PVD) or chemical vapor deposition (CVD) in each case under reduced pressure, ie. at less than 10, in particular less than 1, mbar. Possible PVD methods are vapor deposition, sputtering and anodic or cathodic arc coating. Possible CVD methods are thermal or plasma-supported gas-phase deposition. Plasma-supported methods, such as sputtering or arc coating, are preferred, sputtering being particularly preferred.

In arc coating, the coating material is removed by means of an electric arc, which leads to a high degree of ionization of the coating material in the process gas atmosphere. The molding to be coated can be provided with a bias voltage, which is generally negative and leads to intensive ion bombardment during coating.

In sputtering, the materials to be coated are applied in solid form as a target to the cathode of the plasma system, sputtered under reduced pressure (preferably from $5 \times 10^{-4}$ to $1 \times 10^{-1}$ mbar) in a process gas atmosphere and deposited on the molding. The process gas usually contains a noble gas, such as argon.

Various versions of the sputtering method, such as magnetron sputtering, DC or RF sputtering, bias sputtering or reactive sputtering, and combinations thereof are suitable for the production of the novel layers. In magnetron sputtering, the target to be sputtered is present in an external magnetic field which concentrates the plasma in the region of the target and hence increases the sputtering rate. In DC or RF sputtering, the sputtering plasma is excited in a conventional manner by DC or RF generators. In bias sputtering, the generally negative bias voltage which leads to intensive bombardment of the molding with ions during coating is applied to the molding to be coated.

In reactive sputtering, further reactive gases, such as hydrogen, hydrocarbons, oxygen, nitrogen, etc. are mixed in the desired amount with the process gas at a suitable time. As a result, the relevant metal oxide, nitride, carbide, carbide oxide, carbide nitride, oxide nitride or carbide oxide nitride layers can be deposited directly by sputtering a metal, for example in the presence of hydrocarbons, oxygen and/or nitrogen, in the process gas.

This group of gases is defined as "a reactive gas" within the context of the present invention.

The desired layer thickness, chemical composition and microstructure are obtained as described below, by means of the coating parameters process gas pressure, process gas composition, sputtering power, sputtering mode, substrate temperature and coating time.

PVD/CVD methods allow the layer thickness to be changed in a manner which is very reproducible and, as a result of the coating parameters (eg. coating rate, coating time), simple. Said layer thickness can be readily chosen from a few atomic layers to about 100 μm. For coated catalysts, coat thicknesses are preferably from 100 nm to 50 μm, in particular from 300 nm to 20 μm, very particularly from 0.5 μm to 10 μm.

PVC/CVD technologies, in particular sputtering technology, offer very considerable freedom with regard to the chemical composition of the alloy layer. The spectrum of the layers which can be produced ranges from two- through three- or multi-component metallic alloys to mixed oxide, nitride or carbide systems.

Multicomponent metallic alloys are usually prepared by introducing a suitable target into the coating unit and by subsequently sputtering the target in a noble gas plasma, preferably argon. Suitable targets are either homogeneous alloy targets which are prepared in a known manner by melting processes or by powder metallurgy methods, or inhomogeneous mosaic targets which are prepared by joining together smaller pieces having different chemical compositions or by placing or sticking small, disk-like material pieces on homogeneous targets. Alternatively, metallic alloys can be prepared by simultaneously sputtering two or more targets of different compositions. The moldings to be coated are arranged so that they are exposed in an advantageous manner to the flow of material produced by sputtering of the various targets. In an advantageous arrangement, the moldings to be coated are passed periodically through the simultaneously burning sputtering plasmas, a layer whose composition is periodically modulated through the layer depth being applied to the moldings. The modulation period can be adjusted within wide limits by the sputtering power of the individual targets and by the speed of the periodic movement of the moldings. In particular, by setting a very small modulation period, it is also possible to achieve very thorough mixing of the individual layers and hence deposition of a homogeneous alloy.

The preparation of mixed oxide, nitride or carbide systems can be carried out either by the sputtering of corresponding oxide, nitride or carbide targets or by the reactive sputtering of metal targets in corresponding reactive gas plasmas. By appropriately controlling the reactive gas flow during the reactive sputtering, it is also possible to achieve partial oxidation, nitride formation or carbide formation in the alloy layer. For example, in alloys of noble and non-noble metals, selective oxidation of the non-noble metal component can be achieved by skillful adjustment of the $O_2$ gas flow.

With the stated deposition methods it is also possible to produce thin gradient layers whose composition is varied in a defined manner with increasing layer depth. The variation of the composition can be controlled in a simple manner by the corresponding coating parameters (for example, sputtering power in the case of simultaneous sputtering, reactive gas flow, etc.). Moreover, non-periodic layer systems, for example layer systems comprising different metallic alloys or composite layers consisting of metallic and oxide layers, are also possible.

The microstructure (for example phase distribution, crystallite shape and size, crystallographic orientation) and the porosity of the layers can be controlled within wide limits by the choice of suitable deposition parameters. For example, DC magnetron sputtering of a metallic target at a pressure of from $4 \times 10^{-3}$ to $8 \times 10^{-3}$ mbar leads to very dense and hence pore-free layers, whereas a column-like morphology with increasing porosity is observed at a sputtering pressure above $1 \times 10^{-2}$ mbar. In addition to the sputtering pressure, the substrate temperature and any applied bias voltage have a considerable effect on the microstructure.

Whereas only alloy compositions close to the eutectic point or points can be prepared by the conventional methods for the preparation of amorphous alloys, which are based on the principle of rapid quenching of a melt, the novel processes permit the preparation of amorphous or nanocrystalline alloys over a substantially wider composition range. The cooling rate when a species (atom, molecule, cluster) produced by sputtering strikes the substrate to be coated is several times higher than the cooling rates during quenching of a macroscopic melt. The (thermodynamically unstable) amorphous state of an alloy can therefore be much more readily frozen in the novel processes than in the conventional ones. Moreover, the possibilities described above for the production of periodic multiple layers having a modified close-range atomic order substantially favor the formation of an amorphous structure. The invention therefore provides access to amorphous alloys which are not obtainable in other ways.

Examples of suitable carriers are moldings of glass, quartz glass, ceramic, titanium dioxide, zirconium dioxide, alumina, aluminosilicates, borates, steatite, magnesium silicate, silica, silicates, metal, carbon, eg. graphite, or mixtures of the stated materials. The carrier may be porous or nonporous. Suitable moldings are, for example, strands, pellets, wagon wheels, stars, monoliths, spheres, chips, rings or extrudates. Spheres, pellets and strands are particularly preferred.

In order to achieve uniform coating of the carriers, it is advantageous to keep the carriers in random movement during coating or by means of suitable mechanical apparatuses or apparatuses having good flow mechanical properties. Suitable mechanical apparatuses are, for example, periodically moved cages, drums, shells or channels in which the carriers are caused to make random movements. The mechanical apparatus must of course have suitable orifices to permit the passage of the coating material or access by any plasmas required.

The adhesion of the alloy to the carrier is as a rule very good. If necessary, it may be further increased by a plasma etching treatment to be carried out before the actual coating.

The catalytic activity of the coated moldings can be greatly increased by a suitable treatment. This treatment comprises, for example, a thermal treatment or the selective reaction of one of the alloy components with a gas or gas mixture at elevated temperatures. Particular examples are selective oxidation of the non-noble component of the alloy to form an oxide of this component or the nitriding of a component to give the nitride of this component. The remaining component or components of the alloy are then generally present in finely divided metallic form in the oxide or nitride matrix. The contact area between nitride or oxide and these metal components is as a rule very large, and this may have an advantageous effect on the catalytic activity and/or selectivity. The stability of the metal components to sintering is as a rule very high.

The aftertreatment of the coated moldings can also be effected by treatment with acids, such as HF, HCl, $HNO_3$ or $H_3PO_4$, bases, such as NaOH, CrOH, $Ba(OH)_2$, $Sr(OH)_2$, KOH or RbOH, or other reagents, such as sulfonic acids or halohydrocarbons, which dissolve away or react with one or more components of the alloy or treat the surface of one or more components of the alloy.

The specific surface area of the coated moldings generally increases in the aftertreatment or in the catalytic reaction. The specific surface area can be determined, for example, by the conventional, widely known BET (Brunauer, Emmet and Teller) method.

Examples of suitable methods of treatment comprise reacting the coated moldings with oxidizing and/or reducing gases or gas mixtures, for example, air, hydrogen or mixtures of CO and air, $CO_2$ and $H_2$, $N_2$ and steam or air and steam, at from 100° to 500° C. The reaction time may be from a few minutes to a few weeks. In particular, the treatment with mixtures of $CO/O_2$, $H_2O/CO_2$ or $CO/H_2/H_2O/N_2$ lead to a material having high catalytic activity and a substantially increased BET surface area.

According to the invention, the alloy layer applied to the moldings contains at least one metal selected from the group consisting of aluminum, gallium, silicon, germanium, tin, lead, bismuth, yttrium, titanium, zirconium, vanadium, niobium, tantalum, chromium, molybdenum, tungsten, iron, cobalt, ruthenium, rhodium, palladium, osmium, iridium, platinum, copper, silver, gold and zinc. In particular, alloys having very readily oxidizable components, such as silicon, aluminum, zirconium or titanium, are suitable for coating. In general, the alloys furthermore contain at least one element from group VIII or Ib of the Periodic Table of elements. Examples of particularly suitable alloy systems are Pd—Zr, Ru—Zr, Pt—Zr, Cu—Zr, Fe—Zr, Ni—Zr, Ru—Re—Zr, Cu—Ti, Pd—Ti, Pt—Ti, Cu—Si, Pd—Si, Ru—Si, Pt—Pd—Si, Cu— Pt—Ti, Cu—Pt—Zr, Cu—Al, Pd—Al, Pt—Al, Ru—Sn—Si, Ru—Sn—Ti, Ru—Pb—Ti, Ru—Pb—Si and Au—Zr.

The composition of the alloys can be varied within wide ranges, for example the least noble component can be present as a rule in an amount of from 5 to 95 atom %. The sputtered alloys are generally amorphous.

The moldings produced by the novel process can be used for nucleophilic and electrophilic substitutions, for addition and elimination reactions, for double bond and skeletal isomerizations, including rearrangement reactions, and for redox reactions, for example for alkylation, isomerization, disproportionation, acylation, cyclization, hydration, dehydration, amination, hydrogenation, dehydrogenation, dehydrocyclization, hydroxylation, oxidation, epoxidation, skeletal isomerization and combinations of these reactions, and for the selective reaction of organic molecules. The moldings produced by the novel process can be used for reactions as described, for example, in W. Hölderich, "Zeolites: Catalysis for the synthesis of organic compounds", Stud. Surf. Sci, Catal., 49 (1989), 69–93, or W. Hölderich and H. van Bekkum, "Zeolites in organic Syntheses", Stud. Surf. Sci. Catal. 58 (1991) 631–727.

Particularly after activation, the coated moldings can be used as coated catalysts for hydrogenation, oxidation and isomerization reactions, very particularly for selective hydrogenation reactions.

Examples of these are:

selective hydrogenation of propyne, selective hydrogenation of butadiene, selective hydrogenation of acetylene, selective hydrogenation of butynol, selective hydrogenation of octadiene to octene, selective hydrogenation of benzene to cyclohexene, hydrogenation of carbon monoxide, hydrogenation of carbon dioxide, hydrogenation of maleic anhydride, hydrogenation of $NO_x$ to $NH_3$ or $NH_2OH$, and the preparation of carboxamides from nitriles or amines from carboxylic acids, amination of aromatics, in particular the reaction of benzene with ammonia to give aniline, reductive amination of aldehydes and ketones to give amines, Wacker synthesis, the preparation of acetaldehyde from ethylene, oxidation of butane to maleic anhydride, oxidation of carbon monoxide, oxidation of alcohols to aldehydes, ketones or carboxylic acids, oxidation of alkanes to alcohols, aldehydes and ketones, oxidation of aldehydes/ketones to carboxylic acids, hydroxylation of aromatics, for example oxidation of benzene to phenol or toluene to cresol, oxidation of propylene to acrolein or acrylic acid, ammoxidation, for example of toluene with $NH^3/O^2$ to give benzonitrile or of propylene to give acrylonitrile. Epoxides can be converted into aldehydes/ketones and, under hydrogenating conditions, into alcohols, for example styrene/oxide derivatives into the corresponding phenylacetaldehydes or, under hydrogenating conditions, into phenylethanols.

EXAMPLES

Example 1

Preparation of Catalyst I (Comparative Example)

An amorphous $Pd_{33}Zr_{66}$ alloy is prepared by the melt spinning process. The material, which is in the form of a tape about 50 μm thick, is X-ray amorphous and has no measurable BET surface area. The tape is mechanically comminuted and is treated with steam (partial pressure about 40 mbar) for 20 hours at 320° C. The X-ray diffraction pattern of the material now shows lines for palladium and zirconium dioxide; its BET surface area is about 15 $m^2/g$. The material is milled to give a powder and is mixed with aluminum oxide hydroxide so that the mixture has a palladium content of 0.25%. This mixture is molded to give pellets, which are calcined. For the catalytic reactions, the pellets are milled to give 1–1.6 mm chips.

Example 2

Preparation of catalyst II

A 1 μm thick $Pd_{33}Zr_{66}$ layer is applied to glass spheres of 2 mm diameter by simultaneously sputtering a Pd and a Zr target. The pressure of the argon gas during sputtering was 5*10-3 mbar; the material is X-ray amorphous and has no measurable BET surface area.

The coated spheres are treated with steam (partial pressure about 40 mbar) for 20 hours at 320° C. The X-ray diffraction pattern of the material now shows lines for palladium and zirconium dioxide; its BET surface area is about 0.3 $m^2/g$. The material has a palladium content of 0.25% and can be used directly in a catalytic reaction.

Example 3

Catalytic hydrogenation of 2-butyn-3-ol in the gas phase

2-Butyn-3-ol is passed, together with a stoichiometric amount of hydrogen, over 5 g of catalyst at 150 ° C. The space velocity is 2 g of butynol per g of catalyst per hour. The product stream is condensed, collected in a vessel and analyzed by means of a gas chromatograph. The conversion and the selectivity with respect to 2-buten-3-ol are calculated using the following formulae:

$$\text{Conversion} \frac{[\text{2-Butyn-3-ol}] \text{ starting material} - [\text{2-butyn-3-ol}] \text{ product}}{[\text{2-Butyn-3-ol}] \text{ starting material}} \times 100\%$$

[. . .] = mol percent of the compound in the starting material or product $$\text{Selectivity of 2-buten-3-ol} \frac{[\text{2-Butyn-3-ol}] \text{ product}}{\text{Conversion}} \times 100\%$$

All catalytic results are summarized in the Table below. The catalysts used are equivalent with regard to the palladium content:

| Catalyst | Conversion | Selectivity$_{\text{2-buten-3-ol}}$ |
| --- | --- | --- |
| I (comparison) | 50% | 78% |
| II | 97% | 84% |

Catalyst I is a catalyst prepared from a melt-spun amorphous alloy.

Catalyst II is an activated coated catalyst prepared from a molding coated by sputtering.

The superiority of the novel coated catalyst, both in terms of the conversion and in terms of the 2-buten-3-ol selectivity, is clearly evident from the table.

Example 4

Preparation of catalyst III

A 1 μm thick $Cu_{70}Zr_{30}$ layer is applied to glass spheres of 2 mm diameter by simultaneously sputtering a Cu and a Zr target. The pressure of the argon gas during sputtering was $5*10^{-3}$ mbar; the material is X-ray amorphous and has no measurable BET surface area.

The spheres are treated with a mixture of hydrogen and carbon dioxide (molar ratio 3:1, total pressure 1 bar) for 20 hours at 280° C. The X-ray diffraction pattern of the material shows lines for copper and zirconium dioxide; its BET surface area is about 0.3 $m^2/g$. The material has a copper content of 0.5%.

The material can be used directly in catalytic reactions.

Example 5

Preparation of further catalysts by sputtering

Various carriers of suitable material and suitable shape (cf. Table below) were placed on a circular steel net (diameter 150 mm) having a mesh size of 0.4 mm and were introduced into a sputtering unit. One or more targets corresponding to the table were used at a distance of 60 mm. The unit was evacuated to $10^{-6}$ mbar by means of a two-stage pump system. Argon was then introduced to a pressure of $9\times10^{-3}$ mbar. By applying an RF voltage at a power of 500 W to the steel net, the carriers were subjected to a sputter etching treatment for 1 minute. After completion of the etching treatment, argon was introduced to give a pressure corresponding to the table. By applying a suitable voltage to the target or targets, a layer was deposited on the carriers. In the simultaneous sputtering of a plurality of targets, the steel net with the carriers was periodically passed over the various targets. In all cases, the carriers were randomly moved by mechanical excitation of the steel net, in order to ensure homogeneous coatings. The results are summarized in the Table below.

TABLE

| No. | Carrier | Target 1 | Power 1 [W] | Target 2 | Power 2 [W] | Sputter pressure [mbar] | Substrate mode | Composition [Atom %] | Layer thickness [nm] |
|---|---|---|---|---|---|---|---|---|---|
| 1 | Glass spheres (2 mm Ø) | $Pd_1Zr_2$ (150 mm Ø)£ | 500 (RF) | — | — | $5 \times 10^{-3}$ (Ar) | stationary | $Pd_{34}Zr_{66}$ | 1000 |
| 2 | Glass spheres (2 mm Ø) | $Pd_1Zr_2$ (150 mm Ø) | 500 (RF) | — | — | $2.5 \times 10^{-2}$ (Ar) | stationary | $Pd_{34}Zr_{66}$ | 1000 |
| 3 | Glass spheres (2 mm Ø) | $Pd_1Zr_2$ (150 mm Ø) | 500 (RF) | — | — | $5 \times 10^{-2}$ (Ar) | stationary | $Pd_{34}Zr_{66}$ | 1000 |
| 4 | Glass spheres (2 mm Ø) | $Pd_1Zr_2$ (150 mm Ø) | 500 (RF) | — | — | $5 \times 10^{-3}$ (Ar) | stationary | $Pd_{34}Zr_{66}$ | 5000 |
| 5 | Glass spheres (2 mm Ø) | $Pd_1Zr_2$ (150 mm Ø) | 500 (RF) | — | — | $5 \times 10^{-3}$ (Ar) | stationary | $Pd_{34}Zr_{66}$ | 10000 |
| 6 | Steatite spheres (2 mm Ø) | $Pd_1Zr_2$ (150 mm Ø) | 500 (RF) | — | — | $2.5 \times 10^{-2}$ (Ar) | stationary | $Pd_{34}Zr_{66}$ | 1000 |
| 7 | Steatite spheres (2 mm Ø) | $Cu_{70}Zr_{30}$ (150 mm Ø) | 500 (RF) | — | — | $2.5 \times 10^{-2}$ (Ar) | stationary | $Cu_{70}Zr_{30}$ | 1000 |
| 8 | Steatite spheres (2 mm Ø) | $Cu_{70}Zr_{30}$ (150 mm Ø) | 500 (RF) | — | — | $2.5 \times 10^{-2}$ (Ar) | stationary | $Cu_{70}Zr_{30}$ | 5000 |
| 9 | Glass spheres (2 mm Ø) | Pd (200 mm Ø) | 25 (RF) | — | — | $5 \times 10^{-3}$ (Ar) | stationary | Pd | 10 |
| 10 | Glass spheres (2 mm Ø) | Pd (200 mm Ø) | 25 (RF) | — | — | $5 \times 10^{-3}$ (Ar) | stationary | Pd | 100 |
| 11 | Glass spheres (2 mm Ø) | Pd (200 m Ø) | 500 (RF) | — | — | $5 \times 10^{-3}$ (Ar) | stationary | Pd | 1000 |
| 12 | Glass spheres (2 mm Ø) | Pd (200 mm Ø) | 25 (RF) | — | — | $5 \times 10^{-2}$ (Ar) | stationary | Pd | 10 |
| 13 | Glass spheres (2 mm Ø) | Pd (200 mm Ø) | 25 (RF) | — | — | $5 \times 10^{-2}$ (Ar) | stationary | Pd | 100 |
| 14 | Glass spheres (2 mm Ø) | Pd (200 m Ø) | 500 (RF) | — | — | $5 \times 10^{-2}$ (Ar) | stationary | Pd | 1000 |
| 15 | Steatite spheres (2 mm Ø) | Pd (200 mm Ø) | 25 (RF) | — | — | $5 \times 10^{-3}$ (Ar) | stationary | Pd | 100 |
| 16 | Steatite spheres (2 mm Ø) | Pd (200 mm Ø) | 25 (RF) | — | — | $5 \times 10^{-2}$ (Ar) | stationary | Pd | 100 |
| 17 | Glass spheres (2 mm Ø) | Pd (200 mm Ø) | 100 (RF) | Zr (150 mm Ø) | 1200 (DC) | $5 \times 10^{-3}$ (Ar) | Rotation 10 rpm | $Pd_{36}Zr_{64}$ | 100 |
| 18 | Glass spheres (2 mm Ø) | Pd (200 mm Ø) | 100 (RF) | Zr (150 mm Ø) | 1200 (DC) | $5 \times 10^{-3}$ (Ar) | Rotation 10 rpm | $Pd_{36}Zr_{64}$ | 1000 |
| 19 | Glass spheres (2 mm Ø) | Pd (200 mm Ø) | 100 (RF) | Zr (150 mm Ø) | 1200 (DC) | $2.5 \times 10^{-2}$ (Ar) | Rotation 10 rpm | $Pd_{36}Zr_{64}$ | 100 |
| 20 | Glass spheres (2 mm Ø) | Pd (200 mm Ø) | 100 (RF) | Zr (150 mm Ø) | 1200 (DC) | $2.5 \times 10^{-2}$ (AR) | Rotation 10 rpm | $Pd_{36}Zr_{64}$ | 1000 |
| 21 | Glass spheres (2 mm Ø) | Pd (200 mm Ø) | 100 (RF) | Zr (150 mm Ø) | 1200 (DC) | $5 \times 10^{-3}$ (Ar) | Rotation 20 rpm | $Pd_{36}Zr_{64}$ | 100 |
| 22 | Glass spheres (2 mm Ø) | Pd (200 mm Ø) | 100 (RF) | Zr (150 mm Ø) | 1200 (DC) | $5 \times 10^{-3}$ (Ar) | Rotation 20 rpm | $Pd_{36}Zr_{64}$ | 1000 |

TABLE-continued

| No. | Carrier | Target 1 | Power 1 [W] | Target 2 | Power 2 [W] | Sputter pressure [mbar] | Substrate mode | Composition [Atom %] | Layer thickness [nm] |
| --- | --- | --- | --- | --- | --- | --- | --- | --- | --- |
| 23 | Bead gel (1.5 mm Ø) | Pd (200 mm Ø) | 100 (RF) | Zr (150 mm Ø) | 1200 (DC) | $5 \times 10^{-3}$ (Ar) | Rotation 10 rpm | $Pd_{36}Zr_{64}$ | 100 |
| 24 | Bead gel (1.5 mm Ø) | Pd (200 mm Ø) | 100 (RF) | Zr (150 mm Ø) | 1200 (DC) | $5 \times 10^{-3}$ (Ar) | Rotation 10 rpm | $Pd_{36}Zr_{64}$ | 1000 |
| 25 | Steatite spheres (2 mm Ø) | Pd (200 mm Ø) | 100 (RF) | Zr (150 mm Ø) | 1200 (DC) | $5 \times 10^{-3}$ (Ar) | Rotation 10 rpm | $Pd_{36}Zr_{64}$ | 100 |
| 26 | Steatite spheres (2 mm Ø) | Pd (200 mm Ø) | 100 (RF) | Zr (150 mm Ø) | 1200 (DC) | $5 \times 10^{-3}$ (Ar) | Rotation 10 rpm | $Pd_{36}Zr_{64}$ | 1000 |
| 27 | Steatite spheres (2 mm Ø) | Pd (200 mm Ø) | 100 (RF) | Zr (150 mm Ø) | 1200 (DC) | $3 \times 10^{-2}$ (Ar) | Rotation 10 rpm | $Pd_{36}Zr_{64}$ | 1000 |
| 28 | Steatite spheres (2 mm Ø) | Pd (200 mm Ø) | 100 (RF) | Zr (150 mm Ø) | 1200 (DC) | $5 \times 10^{-3}$ (Ar) | Rotation 20 rpm | $Pd_{36}Zr_{64}$ | 1000 |
| 29 | Glass spheres (2 mm Ø) | Pd (200 mm Ø) | 200 (RF) | Zr (150 mm Ø) | 1200 (DC) | $5 \times 10^{-3}$ (Ar) ($O_2$:Ar = 1:50) | Rotation 10 rpm | $(Pd_{52}Zr_{48})O_x$ | 1000 |
| 30 | Steatite spheres£ (2 mm Ø) | Pd (200 mm Ø) | 200 (RF) | Zr (150 mm Ø) | 1200 (DC) | $5 \times 10^{-3}$ (Ar) ($O_2$:Ar = 1:50) | Rotation 10 rpm | $(Pd_{52}Zr_{48})O_x$ £ | 1000 |
| 31 | Glass spheres (2 mm Ø) | Pd (200 mm Ø) | 200 (RF) | Al (200 m Ø) | 1000 (DC) | $5 \times 10^{-3}$ (Ar) | Rotation 10 rpm | $Pd_{56}Al_{44}$ | 1000 |
| 32 | Glass spheres (2 mm Ø) | Pd (200 mm Ø) | 200 (RF) | Al (200 mm Ø) | 1000 (DC) | $5 \times 10^{-3}$ (Ar) ($O_2$:Ar = 1:50) | Rotation 10 rpm | $(Pd_{56}Al_{44})O_x$ | 1000 |
| 33 | Glass spheres (2 mm Ø) | Pt (200 mm Ø) | 500 (RF) | — | —£ | $5 \times 10^{-3}$ (Ar) | stationary | Pt | 1000 |
| 34 | Glass spheres (2 mm Ø) | Pt (200 mm Ø) | 500 (RF) | — | — | $1 \times 10^{-2}$ (Ar) | stationary | pt | 1000 |
| 35 | Glass spheres (2 mm Ø) | Pt (200 mm Ø) | 500 (RF) | — | — | $3 \times 10^{-2}$ (Ar) | stationary | Pt | 1000 |
| 36 | Glass spheres (2 mm Ø) | Pt (200 mm Ø) | 500 (RF) | — | — | $5 \times 10^{-2}$ (Ar) | stationary | Pt | 1000 |
| 37 | Steatite spheres (2 mm Ø) | Pt (200 mm Ø) | 65 (RF) | Zr (150 mm Ø) | 1000 (DC) | $5 \times 10^{-3}$ (Ar) | Rotation 10 rpm | $Pt_{21}Zr_{79}$ | 100 |
| 38 | Steatite spheres (2 mm Ø) | Pt (200 mm Ø) | 350 (RF) | Zr (150 mm Ø) | 1000 (DC) | $5 \times 10^{-3}$ (Ar) | Rotation 10 rpm | $Pt_{54}Zr_{46}$ | 100 |
| 39 | Steatite spheres (2 mm Ø) | Pt (200 mm Ø) | 350 (RF) | Zr (150 mm Ø) | 1000 (DC) | $5 \times 10^{-3}$ (Ar) | Rotation 10 rpm | $Pt_{54}Zr_{46}$ | 1000 |

We claim:

1. In a process for the preparation of a catalyst by vapor deposition of at least two different metal components to form a thin layer coating on a carrier with a thickness up to about 100 μm, the improvement which comprises:

carrying out said deposition by simultaneously sputtering at least one metal component A selected from Group Vlll and Group lb of the Periodic Table of Elements as a metal which is not readily oxidizable together with at least one other metal component B which is readily oxidizable in comparison to component A, said components A and B being arranged as one or more pure metal or metal alloy targets and applied to the carrier in a noble gas plasma at a reduced pressure of from $10^{-5}$ to 1 mbar to form an amorphous metal alloy coating; and selectively reacting at least part of the metal component B with a reactive gas comprising at least one gas selected from the group consisting of oxygen, nitrogen and a hydrocarbon to form its oxide, nitride or carbide matrix, respectively, in which at least part of the metal component A is distributed in finely divided form, any remaining component A or unreacted component B being retained in the coating as the amorphous metal or an amorphous metal alloy.

2. A process as claimed in claim 1, wherein component (A) is selected from the group consisting of iron, nickel, copper, ruthenium, palladium, platinum, and gold.

3. A process as claimed in claim 1, wherein component B is selected from the group consisting of zirconium, titanium, aluminum and silicon.

4. A process as claimed in claim 1, wherein component A is selected from the group consisting of copper, palladium, and platinum, and component B is selected from the group consisting of zirconium and aluminum.

5. A process as claimed in claim 1, wherein said vapor deposition is effected by reactive sputtering of components A and B at from $5\times10^{-4}$ to $10^{-1}$ mbar in a noble gas plasma in the presence of an oxidizing gas.

6. A process as claimed in claim 5, wherein the noble gas is argon.

7. A process as claimed in claim 1, wherein said vapor deposition is effected by sputtering components A and B at from $5\times10^{-4}$ to $10^{-1}$ mbar in a gas plasma consisting of a noble gas to form said metal alloy coating and subsequently treating said coating with said reactive gas at an elevated temperature.

8. A process as claimed in claim 7, wherein the noble gas is argon.

9. A process as claimed in claim 1, wherein the metal component B is selectively reacted with a reactive gas consisting essentially of oxygen to form an oxide matrix of component B containing the finely distributed component A.

10. A process as claimed in claim 9, wherein component A is selected from the group consisting of iron, nickel, copper, ruthenium, palladium, platinum and gold, and component B is selected from the group consisting of zirconium, titanium, aluminum and silicon.

11. A process as claimed in claim 9, wherein component A is selected from the group consisting of copper, palladium and platinum, and component B is selected from the group consisting of zirconium and aluminum.

12. A process as claimed in claim 1, wherein said vapor deposition is effected by the reactive sputtering of components A and B in a noble gas plasma in the presence of oxygen to simultaneously oxidize component B during the sputtering step.

13. A process as claimed in claim 12, wherein the reactive sputtering is carried out at a reduced pressure of from $5 \times 10^{-4}$ to $10^{-1}$ mbar.

14. A process as claimed in claim 1, wherein the reaction with oxygen to form the oxide matrix of component B is carried out in a separate step after the sputtering deposition of the metal alloy of components A and B.

15. A process as claimed in claim 14, wherein the reactive sputtering is carried out at a reduced pressure of from $5 \times 10^{-4}$ to $10^{-1}$ mbar.

16. A process as claimed in claim 1, wherein said vapor deposition is effected by sputtering components A and B at from $5 \times 10^{-4}$ to $10^{-1}$ mbar in a gas plasma consisting of argon.

* * * * *